United States Patent [19]
Peak et al.

[11] Patent Number: 5,237,605
[45] Date of Patent: Aug. 17, 1993

[54] ADJUNCT INTERFACE APPARATUS FOR A TELEPHONE SET

[75] Inventors: Russell S. Peak, Atlanta, Ga.; A. U. Sulijoadikusumo, Manalapan, N.J.

[73] Assignee: AT&T Bell Laboratories, Murray Hill, N.J.

[21] Appl. No.: 632,568

[22] Filed: Dec. 24, 1990

[51] Int. Cl.$^5$ ............................................. H04M 3/56
[52] U.S. Cl. ..................... 379/399; 379/436; 379/454; 379/447; 379/387
[58] Field of Search ............ 379/429, 436, 450, 447, 379/454, 419, 441, 387, 390, 398, 399

[56] References Cited

U.S. PATENT DOCUMENTS

| | | | |
|---|---|---|---|
| 4,375,584 | 3/1983 | Muzumdar et al. | 379/429 |
| 4,459,434 | 7/1984 | Benning et al. | 379/373 |
| 4,741,033 | 4/1988 | Utoh et al. | 379/419 |
| 4,817,127 | 3/1989 | Chamberlain et al. | 379/436 |
| 4,821,319 | 4/1989 | Middleton | 379/399 |

FOREIGN PATENT DOCUMENTS 0294955  12/1986  Japan ..................... 379/419

OTHER PUBLICATIONS

Teleconnect 1A2Plus Dec. 1987.

Primary Examiner—James L. Dwyer
Assistant Examiner—M. Shehata
Attorney, Agent, or Firm—Henry T. Brendzel

[57] ABSTRACT

A telephone set is disclosed which includes an adjunct interface module within the telephone set stand of the telephone set. This adjunct interface module converts the telephone set interface, which connects the telephone set to a premise switching system, to a different interface that is used by adjunct telephone equipment associated with the telephone set. Typically, the telephone set interface is a non-standard, or proprietary, interface, while the adjunct interface is the more common tip-ring interface.

3 Claims, 3 Drawing Sheets

ADJUNCT INTERFACE APPARATUS FOR A TELEPHONE SET

BACKGROUND OF THE INVENTION

The present invention relates to an adjunct interface module which is typically used to connect adjunct telephone equipment to a telephone switching system.

An on-premise switching system, such as a private branch exchange (PBX) or a key/hybrid telephone system, typically provides an on-premise user with access to a set of telecommunication features through a nonstandard telephone set. The telephone set is nonstandard in that it is designed to connect to the telephone set interface provided by the on-premise switching system. The telephone set interface provided by the on-premise switching system can either have more conductors, different line voltages, and/or different signaling rates than a common telephone loop, or "tip-ring", interface provided by a central office. As a result of this different telephone set interface, the switching system is able to offer a set of features to the user at a better price/performance ratio than might be available with conventional, tip-ring telephone equipment.

However, a user may have an investment in adjunct telephone set equipment that is built with the tip-ring telephone interface, e.g., a telephone answering machine, or built with yet another interface, such as an external alert interface. This adjunct equipment may offer the user services that may not yet be available, or affordable, in the user's premise switching system. As a consequence, for the user who would still like to use adjunct telephone equipment, on-premise switching vendors typically provide a physically separate adjunct interface module to the user to convert the adjunct telephone equipment interface to the telephone set interface of the premise switching system.

SUMMARY OF THE INVENTION

We have come to realize that the prior arrangements are disadvantageous from a number of standpoints. For example, since an adjunct interface module is a separate piece of equipment, it typically has costs that are associated with the separate packaging, provides the user with yet another box for which to allocate desk or storage space, and may require the user to configure the adjunct interface module for a particular adjunct. For instance, a user who would like his or her tip-ring answering machine to be used in conjunction with a nonstandard telephone set will have to allocate space for three pieces of equipment: the answering set, the adjunct interface module, and the telephone set. As a result, a certain amount of "box proliferation" results, i.e., the user who wants to access adjunct services must deal with yet another separate piece of equipment.

A further problem exists when the adjunct interface module can provide a number of different adjunct interfaces over a particular cable. This requires the user to configure the adjunct interface module so that the appropriate adjunct interface is provided, via the cable, to a particular piece of adjunct equipment. For instance, an adjunct interface module may support either a tip-ring interface or an external alert interface (the former interface allows equipment such as an answering machine to be used while the later interface allows equipment to ring an alert, e.g., a bell). As a result, the user typically has to physically access the adjunct interface module in order to configure the appropriate adjunct interface, e.g., by choosing a particular switch setting on the internal circuitry of the adjunct interface module so that the tip-ring interface is provided for the answering machine.

Therefore, in accordance with the invention, we have realized an apparatus for a telephone set which includes an adjunct interface module. In a preferred embodiment, the adjunct interface module is included within a set stand of the telephone set. Thus, the adjunct interface module is packaged in the telephone set stand and the additional space required by a physically separate adjunct interface module is eliminated. As a result, a user does not have to contend with box proliferation.

In accordance with a feature of the invention, the adjunct interface module can be installed in the field to allow a user to easily re-configure a telephone set to the type of adjunct interface needed.

In accordance with another feature of the invention, the user can reconfigure the adjunct interface module from the telephone set to provide the type of adjunct interface needed.

DETAILED DESCRIPTION

Figure 1:
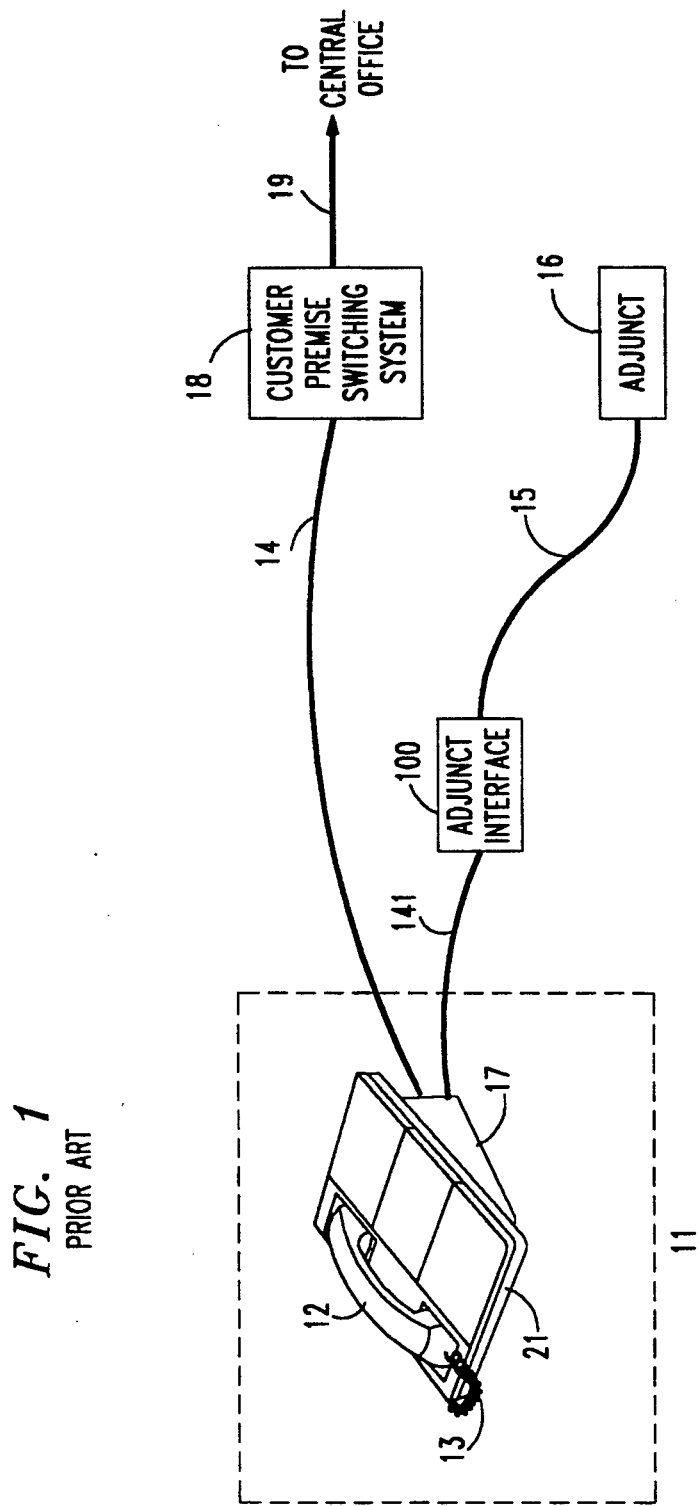
FIG. 1 illustrates a single user telephone configuration, with an adjunct attached, as in the prior art.

FIG. 1 illustrates a single user telephone set configuration as known in the prior art. A user can receive or originate telephone calls by lifting handset 12 which is connected by electrical cord 13 to telephone housing 21 of telephone set 11. Telephone set 11 is electrically connected via cable 14 to customer premise switching system 18 (typically a PBX or key/hybrid system). Switching system 18 is connected to a telephone central office by cable 19. The term "cable" is used herein to refer to a plurality of wires, or conductors, for interconnecting, both physically and electrically, two pieces of equipment. The term "interface" is used herein to refer to a specification of the interconnection between two pieces of equipment, the specification including the type, quantity, and function of the interconnecting wires and the type and form of signals present on the wires (e.g., see *IEEE Standard Dictionary of Electrical and Electronics Terms*, ANSI/IEEE Std. 100-1984, Third Edition). Thus two pieces of equipment with the same interface can be interconnected together by using a cable which supports that interface, i.e., a cable which falls within the interface specification. Although a particular cable can potentially support a number of different interfaces it is assumed herein, for simplicity, that a cable is uniquely identified by the interface associated with the cable in a particular example.

Cable 19 supports a common telephone interface and for illustrative purposes represents one of a plurality of "tip-ring" connections to the central office. However, the interface supported by cable 14 is typically specific to switching system 18 and will have different signaling rates, line voltages, and/or a different number of actual wires within cable 14 than cable 19, i.e., cable 14 supports a different interface from cable 19. As a result, as taught in the prior art, a piece of adjunct equipment with a tip-ring interface, such as an answering machine, cannot be directly connected to cable 14 to be used in conjunction with telephone set 11 (e.g., to provide an answering machine service), without first providing a physically separate adjunct interface module to convert the tip-ring interface of the answering machine to the interface of switching system 18. This is shown in FIG. 1, where the interface of switching system 18 is extended, via cable 141, to adjunct interface module 100 which converts the switching system interface supported by cable 141 to the tip-ring interface of adjunct 16 supported by cable 15. Unfortunately, since an adjunct interface module is a separate piece of equipment, it typically has costs that are associated with the separate packaging and provides the user with yet another box to be concerned about, i.e., "box proliferation" (e.g., allocation of space, power connections, configuration, etc.).

Figure 2:
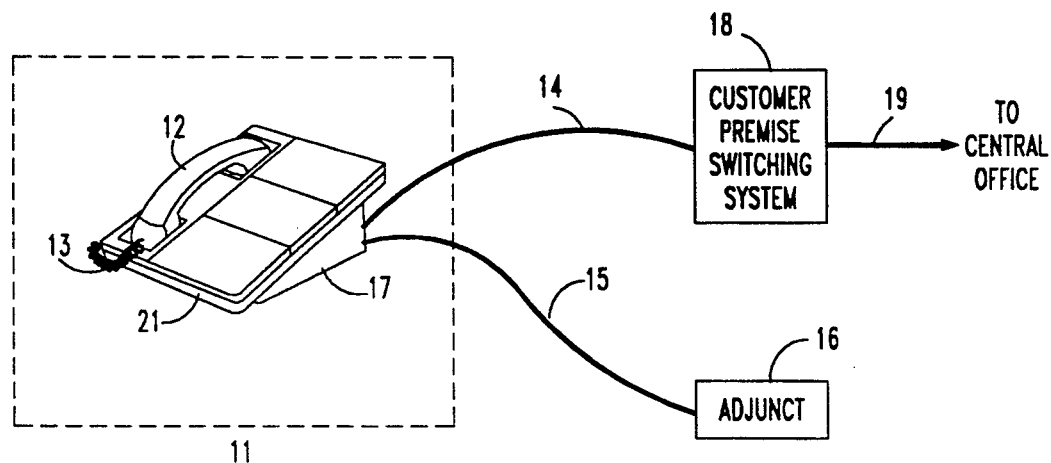
FIG. 2 illustrates a single user telephone configuration, with an adjunct attached, embodying the principles of the invention.

However, in accordance with the invention, we have realized an apparatus for a telephone set which includes an adjunct interface module. Thus, the adjunct interface module is integrated, or packaged, into the telephone set and the additional space required by a physically separate adjunct interface module is eliminated. As a result, a user does not have to be concerned about box proliferation. In addition, by integrating the adjunct interface module into the telephone set, in accordance with the invention, the user can be provided with the capability of configuring the adjunct interface module from the telephone set. As shown in FIG. 2, representative answering machine adjunct 16 is directly connected to telephone set stand 17, with the conversion between the interface of adjunct 16 and the interface of switching system 18 being accomplished by the adjunct interface module within the telephone set stand. Thus, separate adjunct interface module 100 and cable 141 are eliminated and the user may be also provided with the capability to configure the adjunct interface module from the telephone set.

Figure 3:
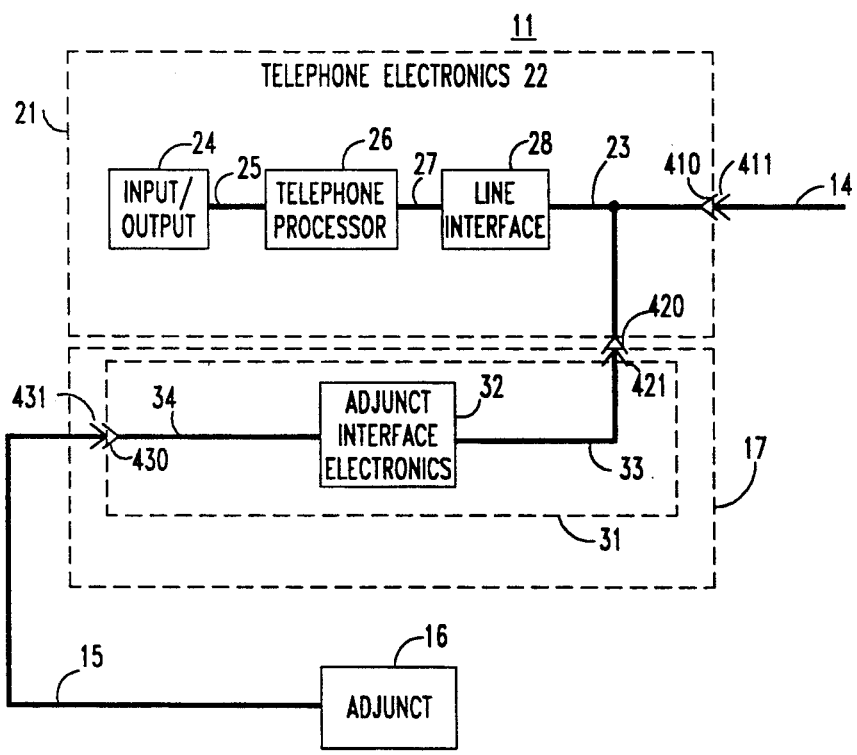
FIG. 3 is an electrical block diagram of the telephone set of FIG. 2 embodying the principles of the invention.

Before describing the mechanical aspects of the inventive concept, reference is made to FIG. 3 which depicts an illustrative electrical block diagram of telephone set 11, embodying the principles of the invention. It should be noted that the term "connector" as used herein is representative of any of the well-known methods and techniques for interconnecting two wires together. Illustratively, a connector is assumed to comprise a "jack" and a "plug". Telephone set 11 is comprised of telephone housing 21 and telephone set stand 17. As is taught in the prior art, telephone electronics 22 is enclosed within telephone housing 21. (Telephone electronics 22 comprises the circuitry which allows a user to place a telephone call to, or receive a telephone call from, switching system 18, and includes input/output 24 (e.g., dial-pad, switchhook, etc.), telephone processor 26, and line interface 28.) Telephone electronics 22 is connected to cable 14 by lead 23 via jack 410 and plug 411. Telephone housing 21 utilizes telephone set stand 17 to provide better access and viewing angle for the user. Within telephone set stand 17 is module housing 31. Module housing 31 contains adjunct interface electronics 32 which converts the interface of adjunct 16 to the interface of switching system 18. Adjunct interface electronics 32 is connected to cable 15 by lead 34 via jack 430 and plug 431, and to cable 14 by lead 33 via jack 420 and plug 421, and lead 23.

Figure 4:
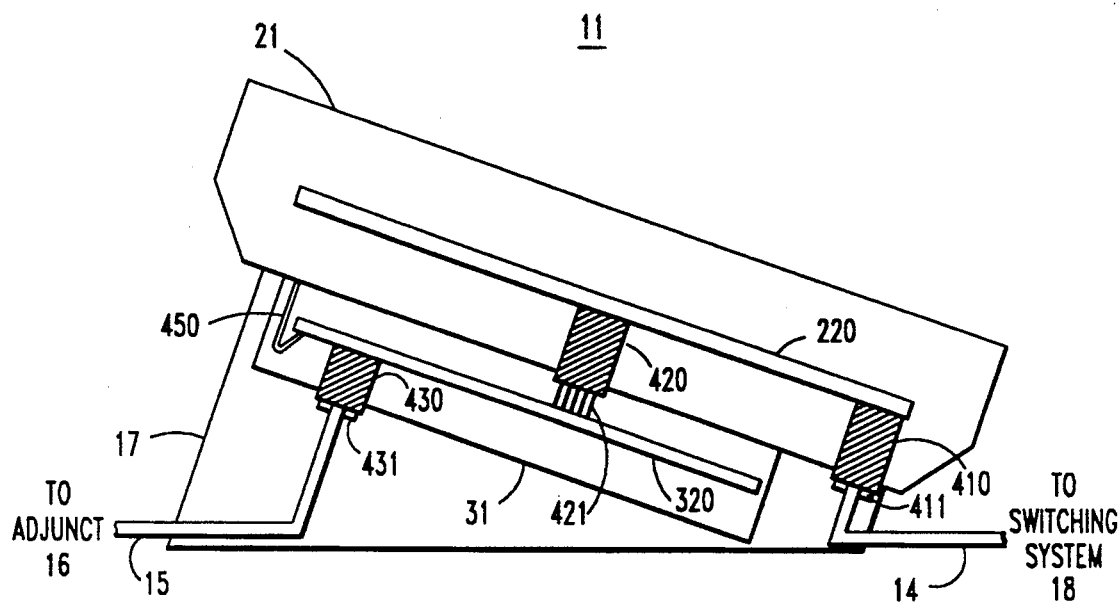
FIG. 4 is a cross-sectional view of an illustrative physical design arrangement for the telephone set of FIG. 2 embodying the principles of the invention.

FIG. 4 illustrates a cross section of telephone set 11. The implementations of the physical arrangement itself, such as mounting connectors, printed circuit boards, etc., use techniques taught in the prior art. Within telephone housing 21 is circuit board 220 which may be of any desired type of circuit board (e.g., a rigid double-sided printed wiring board) for carrying telephone electronics 22, jacks 410 and 420, and lead 23 of FIG. 3. It should be noted that housing 21 is so configured as to allow access to jacks 420 and 410, which are the receptacles for plug 421 on circuit board 320, and plug 411 on cable 14, respectively. Within telephone set stand 17 is module housing 31. Module housing 31 contains circuit board 320 (e.g., a rigid double-sided printed wiring board) which carries adjunct interface electronics 32, plug 421, jack 430, and leads 33 and 34 of FIG. 3. Plug 421 when inserted into jack 420 provides the electrical connectivity to cable 14 and the physical connection to mount circuit board 320 to the bottom of telephone housing 21. However, to provide additional support to circuit board 320, an additional restraint can also be provided as illustrated by tab 450 which represents one of any number of tabs that may be mounted to telephone housing 21 to hold circuit board 320 in place.

Over circuit board 320 is placed module hosing 31, which can be connected, in any number of well-known ways, to telephone housing 21. (It is preferable that module housing 31 be removable from set housing 11 to facilitate later installation or replacement of circuit board 320.) It should be noted that module housing 31, as shown in FIG. 4, is so configured as to allow access to jack 430. Module housing 31, though not specifically required by the inventive concept, does provide additional protection to circuit board 320 and the user, if the telephone set stand is removed. Additionally module housing 31 can be constructed, in any number of well-known ways, to also function as a wall mount for telephone set 21 when set telephone set stand 17 is removed, which would then require that module housing 31 be present to protect circuit board 320. Finally, telephone set stand 17 fits over module housing 31 and is connected to telephone set housing 21 in any number of well-known ways. As illustratively shown herein, telephone set stand 17 is so configured as to allow cables 14 and 15 to pass through the telephone set stand.

The arrangement as described herein also allows circuit board 320 to be field-installable. Specifically, since circuit board 320 is mounted to telephone housing 21 by plug 421 and tab 450, a user is able to change circuit board 320 to a different board (for either a different function or for maintenance) without exposing circuit board 220 to user contact. As a result, the telephone service provided by telephone set 11 is not interrupted and telephone set 11 is additionally protected from damage by the user.

Figure 5:
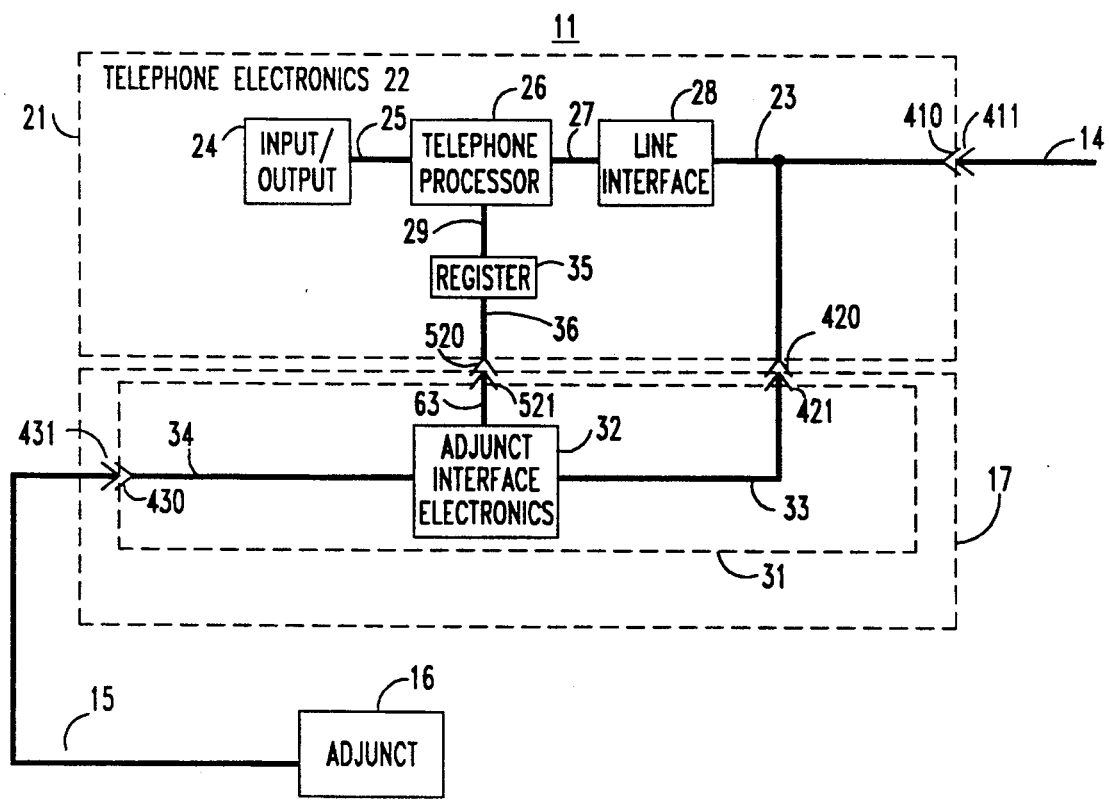
FIG. 5 is an electrical block diagram of a second embodiment of the telephone set of FIG. 2 embodying the principles of the invention.

In addition, adjunct interface electronics 32 may support a number of different adjunct interfaces, e.g., a tip-ring interface or an external alert interface. As a result, this requires the user to configure the appropriate adjunct interface before connecting a particular piece of adjunct equipment. For instance, in order to connect a tip-ring answering machine, to adjunct interface electronics 32, the user must first configure adjunct interface electronics 32 to support a tip-ring interface. Typically, this would be done by the user, in the prior art, by physically accessing adjunct interface electronics 32 in order to choose a particular switch setting associated with the tip-ring interface. However, an advantage of integrating the adjunct interface module into the telephone set is that the user can be provided with the capability of configuring adjunct interface electronics 32 from telephone set 11. To this end, as illustrated in FIG. 5, register 35 and jack 520 are added to telephone electronics 22. Register 35 is connected to telephone processor 26 by lead 29 and to jack 520 by lead 36. The output of register 35 is typically a data value herein associated with a particular one of the adjunct interfaces supported by adjunct interface electronics 32. The user can alter the output of register 35 via input/output 24 in any number of well-known ways. For example, a predefined touch-tone sequence can be input by the user through the dial-pad of telephone set 11, i.e., input/output 24, and provided to telephone processor 26 which then can alter the output of register 35 to a data value associated with the touch-tone sequence. The output of register 35 is then provided to adjunct interface electronics 32 via plug 521 and lead 63. Adjunct interface electronics 32 receives the data value from lead 63 and provides the particular adjunct interface, associated with the received data value, on cable 15. As a result, the user, via input/output 24, can alter the characteristics of adjunct interface electronics 32, e.g., the user can change the interface from a tip-ring interface to an external alert interface without having to physically access adjunct interface electronics 32.

The present invention has been described in terms of an illustrative embodiment. However, it should be realized that the invention is not limited to this particular embodiment and that additional embodiments, modifications and applications which will become obvious to those skilled in the art are within the spirit and scope of the invention.

We claim:

1. Apparatus comprised of:

a telephone set, including a telephone set housing and a telephone set stand for supporting the telephone set housing;

an adjunct interface module, the adjunct interface module being located within the telephone set stand; and telephone electronics means located within the telephone set housing, the telephone electronics means for providing telephone service to a user of the telephone set, where the telephone electronics means is responsive to a user's input for providing adjunct configuration information;

where the telephone set housing further includes a first connecting means and a second connecting means, the first connecting means for electrically interconnecting the telephone electronics means to a premise switching system, and the second connecting means for electrically interconnecting the telephone electronics means to a circuit board of the adjunct interface module, wherein the second connecting means is disposed between the adjunct interface module and the telephone set housing in such a way that the adjunct interface module is mounted to the telephone set housing, and the telephone set housing includes a third connecting means for providing the adjunct configuration information from the telephone electronics means to the adjunct interface module.

2. The invention of claim 1 wherein the telephone electronics means is further comprised of:

input/output means for providing configuration information from a user, telephone processor means responsive to the configuration information and for providing adjunct configuration information; and register means for storing the adjunct configuration information and for providing the adjunct configuration information the the third connecting means.

3. The invention of claim 2 wherein the configuration information is a plurality of touch-tones.

* * * * *